June 12, 1923.
J. M. JACOBS
MUD LUG FOR VEHICLE WHEELS
Filed June 5, 1922
1,458,295
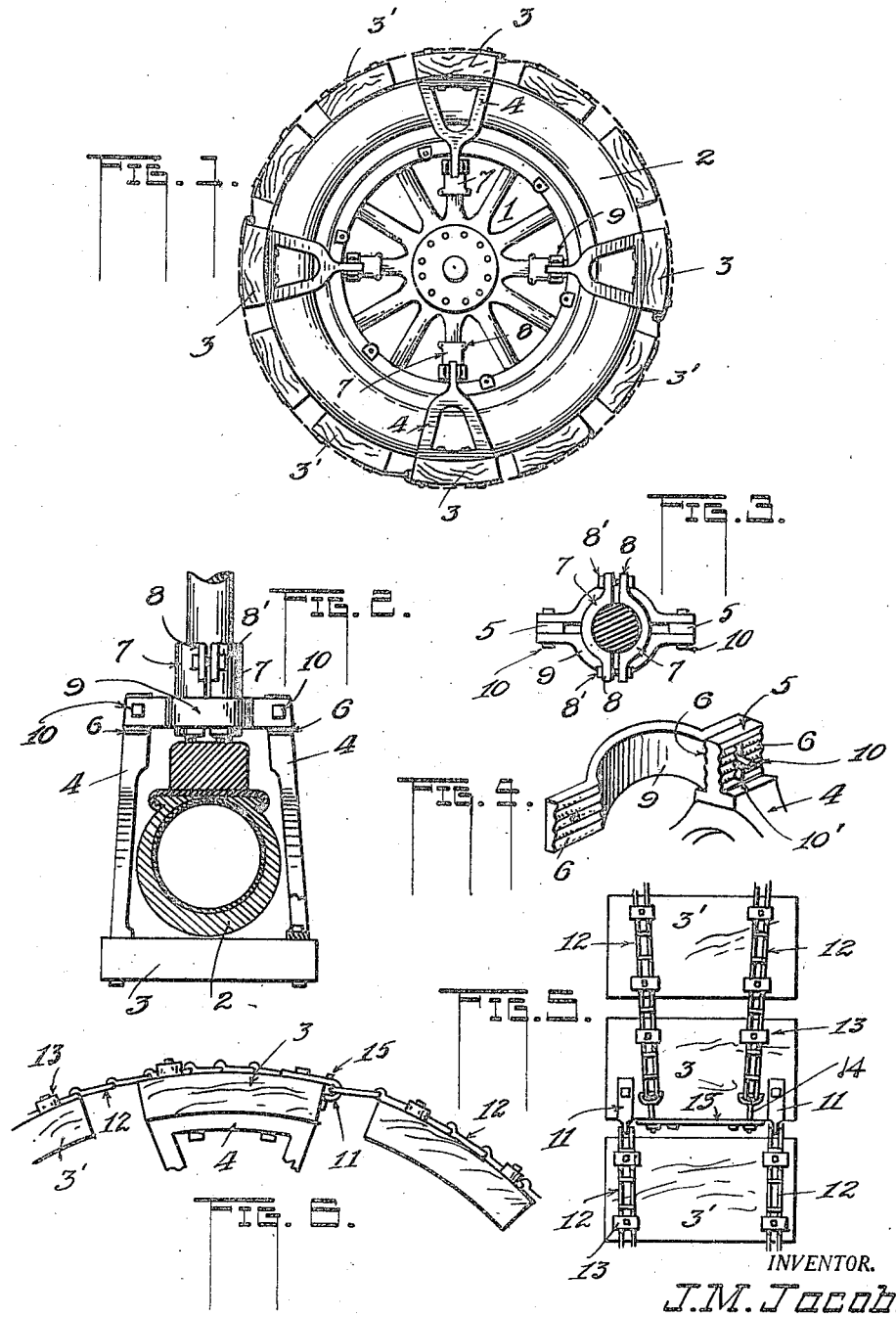
INVENTOR.
J.M.Jacobs,
BY
ATTORNEY.

Patented June 12, 1923.

1,458,295

UNITED STATES PATENT OFFICE.

JAMES M. JACOBS, OF EAST PEORIA, ILLINOIS.

MUD LUG FOR VEHICLE WHEELS.

Application filed June 5, 1922. Serial No. 566,168.

*To all whom it may concern:*

Be it known that I, JAMES M. JACOBS, a citizen of the United States, residing at East Peoria, in the county of Tazewell and State of Illinois, have invented new and useful Improvements in Mud Lugs for Vehicle Wheels; and I do hereby declare that the following is a full, clear, and exact description of the invention, which will enable others skilled in the art to which it appertains to make and use the same.

This invention relates to a traction device for the wheels of power driven vehicles.

It relates more particularly to a member for attachment to the spoke of the wheel, which, together with companion members serve as traction devices or "mud lugs".

An object of the invention is to provide a device, several of which are adapted for attachment to the spokes of a wheel, that can be adjusted thereon to a required position and that, if desired, may serve to support the weight of the vehicle in case a tire becomes deflated to the end that the vehicle may be driven without injury to the tire or its air tube.

Another object is the provision of several of the devices each of which is secured firmly upon one of the spokes of the wheel to which certain tread parts are connected making an endless traction device.

To the end that the invention may be understood, the appended drawing is provided wherein—

Figure 1 is a side elevation of a wheel showing my invention in place thereon.

Figure 2 is a cross section of a wheel-felly, rim and tire, showing the device of my invention applied to one of the spokes of the wheel.

Figure 3 is a transverse section of a spoke showing certain parts included in the invention in plan.

Figure 4 shows in perspective certain parts illustrated in Figure 3. Figure 5 is a plan of parts shown in Figure 1, much enlarged.

Figure 6 is a side elevation of parts shown in Figure 1 produced on a much larger scale.

The numeral 1 indicates the wheel of a power driven truck or other type of vehicle such as a pleasure car, its tire being denoted at 2.

My invention includes a stirrup to be secured to one of the spokes and arranged to carry a shoe that supports the tire and which forms the traction element. That is to say, 3 is one of a series of shoes of wood or metal of any desired form best suited to the particular type of vehicle upon which it is to be used, while 4 represents two members erected thereon and suitably bolted thereto, Figure 2, their inner ends terminating preferably in tongues 5 having serrations 6 on opposite faces as best shown in Figure 4.

Clamped upon each of certain of the spokes of the wheel 1 is a sleeve composed of two parts 7, Figure 3, said parts being held in position on the spoke by the ears 8 thereof and suitable bolts 8'. Adapted to be clamped upon the sleeve thus placed are two yoke-portions 9, each having an extension at its ends serrated to correspond with and adapted to engage the serrations 6 of the tongue 5 described. Bolts 10 serve to secure the yoke portions and the members 4 relatively, and to clamp said portions upon the sleeve 7.

The tongues 5 are slotted at 10' Figure 4 by means of which the yoke-portions may be adjusted to a desired position. As shown in Figure 2, one of the members 4 lies at each side of the tire 2 and both are carried by the spoke together with the shoe 3.

In the drawing I have shown four of the spokes provided with one of the structures described and between the shoes 3 carried by each structure are placed similar shoes 3' held in place by chains as shown in Figures 5 and 6. That is to say, a pair of hooks 11, for example, is secured to each of the blocks 3, near one edge, Figure 5, and a chain 12 is attached to each and secured to each of the intermediate shoes 3' by plates 13, for example, the other ends of the chains being attached to eye-bolts 14 extending through a plate 15 bolted to the edge of each said shoe 3. In this manner a complete tread is furnished for the wheel suitable for driving through mud or snow.

The yoke-portions 9 may be permitted to slide upon the sleeve made up of the parts 7, and the ears 8 may serve as limiting stops for said yoke-portions. By this means the sleeves may be so set upon the spokes that the shoes can be made to support the load through the spokes. In this manner if the tire becomes deflated from any cause it will not be injured since the weight of the vehicle is then wholly supported by the shoes but under ordinary conditions the inflated tire rests upon said shoes. In this event, of course, a large number of spokes must be provided with the shoe carrying structure in order that such load will be supported at proper intervals.

I claim:

1. A device for attachment to a vehicle wheel including a shoe to receive the wheel-tire, a member fixed upon the shoe at each end between which the tire is adapted to lie, and means to encircle a spoke of the wheel comprising separate yoke-members secured to the ends of the first named members.

2. A device for attachment to a vehicle wheel including a shoe to receive upon it the wheel-tire, a member erected upon the shoe at each side of said tire, and means secured to the members and adapted to encircle a spoke of the wheel.

3. A device for attachment to a vehicle wheel including a shoe to receive upon it the wheel-tire, a member erected upon the shoe at each side of the said tire, and means connecting the members within the wheel, and means to limit the movement of the first said means and the shoe toward the center of rotation of the wheel.

4. A device for attachment to a vehicle wheel-spoke including a shoe to receive the wheel-tire upon it, a member erected upon the shoe at each side of the tire, a sleeve adapted to be clamped to the spoke, and a yoke secured to and connecting the members inward from the said tire encircling the said sleeve.

5. In a device of the character described, a shoe adapted to receive upon it the tire of a vehicle wheel including a part extending toward the center of rotation of the wheel, and means to limit the movement of said shoe toward and with respect to the wheel center.

6. In a device of the character described, a series of shoes adapted to receive upon them the tire of a vehicle wheel, each including a part at each side of the tire extending toward the wheel center, a sleeve clamped upon each of certain of the spokes of the wheel and each including a stop, and means connecting the parts on each shoe, the same encircling one of the said sleeves, being slidable thereon and in its sliding movement being limited by said stop.

7. In combination with a vehicle wheel, a series of traction devices overlying the wheel-tread, certain of them including a shoe and a member secured to each end thereof, extending toward the wheel-center and lying at opposite sides of the wheel-rim, means connecting each pair of the members within the wheel and encircling an adjacent spoke and guided thereby, and flexible devices connecting all of the shoes.

8. In combination with a vehicle wheel, a series of traction devices overlying the wheel-tread certain of them including a shoe and a pair of members attached thereto, one at each side of the wheel, said members extending in the direction of the wheel-center, and means connecting each pair of members and encircling a wheel-spoke, guided thereby, and adapted to have movement thereon longitudinally thereof, and means connecting all of the shoes but permitting free movement thereof relatively.

In testimony whereof I affix my signature in presence of two witnesses.

JAMES M. JACOBS.

Witnesses:
WILLIAM BOWERS,
L. J. BALLARD.